United States Patent [19]

Pohl

[11] 4,190,484

[45] Feb. 26, 1980

[54] PRESS FOR PRODUCING SHAPED ARTICLES

[75] Inventor: Andreas P. I. Pohl, Münich, Del.X

[73] Assignees: Rembert Duvelius; Rudiger Graf Von Stosch, both of Fed. Rep. of Germany

[21] Appl. No.: 837,176

[22] Filed: Sep. 28, 1977

Related U.S. Application Data

[62] Division of Ser. No. 733,193, Oct. 18, 1976, Pat. No. 4,080,243.

[30] Foreign Application Priority Data

Oct. 20, 1975 [DE] Fed. Rep. of Germany ....... 2546944

Aug. 10, 1976 [DE] Fed. Rep. of Germany ....... 2635924

[51] Int. Cl.$^2$ .......................... B32B 31/00; B30B 1/23

[52] U.S. Cl. ................................ 156/580; 100/269 A

[58] Field of Search ........................... 100/269 A, 264; 156/580, 583

[56] References Cited

U.S. PATENT DOCUMENTS

| | | | |
|---|---|---|---|
| 2,448,314 | 8/1948 | Kavanagh | 100/269 A |
| 2,634,773 | 4/1953 | Weyant | 100/269 A |
| 2,997,083 | 8/1961 | Pfefer | 100/269 A |
| 3,190,215 | 6/1965 | Howard et al. | 100/269 A |

*Primary Examiner*—Douglas J. Drummond

*Attorney, Agent, or Firm*—Armstrong, Nikaido, Marmelstein & Kubovcik

[57] ABSTRACT

The present invention provides a press to apply pressure to a three dimensional shaped article. The three dimensional shaped object generally has a greater length and width than the dimension to be pressed, and is, for example, a laminate. The press comprises (a) a first horizontal pressing plate and a second horizontal pressing plate facing each other with a nip therebetween; (b) a flexible hollow member disposed against the first horizontal pressing plate on the side opposite the nip, said flexible hollow member being a part of a closed system containing a pressure medium and a mechanism for regulating the pressure of the pressure medium; and (c) an inflexible support behind the flexible hollow member, whereby upon a change of the pressure of the pressure medium, said first horizontal pressing plate is caused to move relative to the second pressing plate.

7 Claims, 17 Drawing Figures

PRESS FOR PRODUCING SHAPED ARTICLES

This is a division of application Ser. No. 733,193, filed Oct. 18, 1976 now U.S. Pat. No. 4,080,243.

BACKGROUND OF THE INVENTION

The present invention relates to a press for the production of laminates and similar shaped articles whose length and width dimensions are a multiple of their vertical dimension, the press having two horizontal pressing plates, at least one of which is movable relative to the other, the shaped articles being given a pressing treatment in the nip between the plates by relative movement thereof.

Known presses in this area of technology are driven by means of either a toggle drive or eccentrics or hydraulic cylinders, with mechanical transmission of the pressing forces to the pressing plates. A disadvantage to this type of construction is that the pressing plates must withstand considerable bending stresses at the pressures used and at the forces produced by the transmission system. Since the pressure is applied to the pressing plate substantially in the form of a spot loading and since there is a corresponding spot loading of the press frame by the back-pressure, the pressing plates must be made relatively heavy to possess a high mechanical strength. The press frame must be heavy enough to take up the bending stresses.

It is therefore an object of the present invention to provide a new press making it possible to use comparatively lightweight pressing plates and a comparatively simple frame construction.

SUMMARY OF THE INVENTION

The present invention provides a press to apply pressure to a three dimensional shaped article. The three dimensional shaped object generally has a greater length and width than the dimension to be pressed, and is, for example, a laminate. The press comprises (a) a first horizontal pressing plate and a second horizontal pressing plate facing each other with a nip therebetween; (b) a flexible hollow member disposed against said first horizontal pressing plate on the side opposite said nip, said flexible hollow member being a part of a closed system containing a pressure medium and means for regulating the pressure of said pressure medium; and (c) an inflexible support behind said flexible hollow member, whereby upon a change of the pressure of said pressure medium, said first horizontal pressing plate is caused to move relative to said second pressing plate.

DETAILED DESCRIPTION OF THE INVENTION

According to the invention, in a press of the type hereinbefore outlined, the moving pressing plate moves as the result of a change in volume of a flexible hollow member controlled by the supply to it and removal from it of a pressure medium, the hollow member being disposed between a support surface and that side of the pressing plate which is remote from the pressing surface. Accordingly, not only is the problem mentioned solved but an advantage is also provided in that the pressure operative for pressing is received over an extended area by the pressing plate and by the correspondingly large bearing or support surface in the press frame; consequently, the pressing plate can be of a simple construction and the press frame can be of light weight since it is required to receive substantially only tensile forces in a direction parallel to the pressure applied by the pressing plates.

In line with this advantage, in a particularly preferred form of the invention the hollow member is an inflatable bag or the like adapted to engage by way of a large area with the pressing plate; in this event, the bag can advantageously engage the pressing plate over the whole area thereof and the opposite bearing or support plate can also take the form of a plane flat plate.

According to a preferred embodiment, the bag has an edge strip which projects on all sides beyond the edges of the pressing plate and which, as a hollow frame, is higher than the rest of the bag region in contact with the pressing plate, the interior of the frame-like edge strip communicating with the interior of the remainder of the bag. As a preferred embodiment, the edge strip has a substantially circular cross-section such that, when the bag is inflated, the material of which the bag is made takes up substantially only tensile stresses. This feature provides a particular advantage of enabling the inflatable bag to be made of a highly flexible, relatively thin, lightweight material; the initial cost of such a press can therefore be considerably reduced. The bag is also certain to follow any deformations of the pressing plate, thus always ensuring a uniform pressure application.

In a preferred embodiment of the invention, the pressing plates are heatable in known manner in which event the bag is made of a heat-resistant material. The reason for the great advantage of this embodiment is that in this particular art, more particularly in connection with the coating of timber panels with decorative surfaces or in the production of other laminates, considerations of environmental protection have led to a change to solvent-free dry adhesives which are usually applied in an aqueous suspension to the surfaces to be stuck together. The sticking power of such adhesives, generally melamine-based adhesives, evolves only in response to an application of heat to the joint, and so this particular embodiment of the invention represents a very simple construction of a hot form of the press of the invention.

Refined steel has been found to be a very advantageous material from which to embody the inflatable bag in this embodiment of the invention, since refined steel is incorrodible and permits the use of high pressures. Stainless steel is a suitable material for such an inflatable bag.

Advantageously, the bag is devised from two sheet-metal members whose edges are sealed together by a clamping frame radially outwards of the hollow frame. This feature has the great advantage of obviating the need for a weld seam or the like in a pressure zone of the bag in an exposed area outside the region of the pressing plates, for in addition to the technical outlay, a weld seam or the like would cause changes in the structure of the material and thus introduce a weak zone in the bag.

Advantageously, to provide a simple construction for the clamping frame, a flexible sealing strip is disposed between the edges of the sheet-metal members, and the inside edge of the sealing strip so extends into the interior of the hollow frame as to provide a substantially tulip-shaped distortion in its cross-section upon inflation. A very simple seal is therefore provided the sealing-tightness of which increases as the pressure increases, since the tulip-shaped cross-section on the inside of the hollow frame enters into bearing engagement with the seam area on both sides of the joint between the two sheet-metal members and the deformation increases as the pressure increases, so that the surface concerned in the sealing-tight engagement also increases as the pressure increases.

Preferably, a reversible-delivery pump is provided for the pressure medium. The special advantage of this feature is that the press can be caused to perform positively controlled pressing and load-relieving cycles merely by reversing the pump or by changing over the delivery side and intake side of the pump.

Any kind of pressure medium in gas or liquid form can be used, but for reasons of economy the preferred pressure medium is water.

Advantageously, the relatively moving pressing plate is the bottom plate of the press. Gravity then assists the opening movement which the press makes when the bag is deflated—i.e., when the bag is pumped empty.

In this embodiment according to the invention, the pressing plate can rest loosely on the bag, so that no special mountings are necessary and the pressing plate is also secured against lateral shifting by the surrounding hollow frame of the bag.

In a very simple form of the invention, the operative movement of the press can be adjusted by spacer members which are introduced between the inflatable hollow member and the pressing plate, thus enabling the press cycle to be shortened by a reduction of the operative movement of the press when thin laminates or shaped articles are being treated.

Preferably, a cover is provided on the pressing plate.

As a further development of the invention, both pressing plates are relatively movable, a hollow member adapted to be supplied by a second pressure medium being provided between the top pressing plate and a top bearing plate.

In all the embodiments of the invention, as a very convenient way of mounting the top press plate, the same is suspended in a cover.

Advantageously, the cover is resiliently suspended by way of its edges on the press frame with an upwardly directed force component. This feature provides the particular advantage that, more particularly in the case of hot presses, the resilient suspension compensates for heat expansion effects.

If required, the press can be a multistage press; in this event, additional hollow members can be disposed between the pressing plates of the discrete stages. However, it may suffice if the group of plates is pressed together merely by a single inflatable bag from below or between two such bags, one at the top and one at the bottom, of the kind hereinbefore described in greater detail.

The invention will be described in greater detail hereinafter with reference to embodiments shown by way of example in the drawings wherein.

Figure 1:
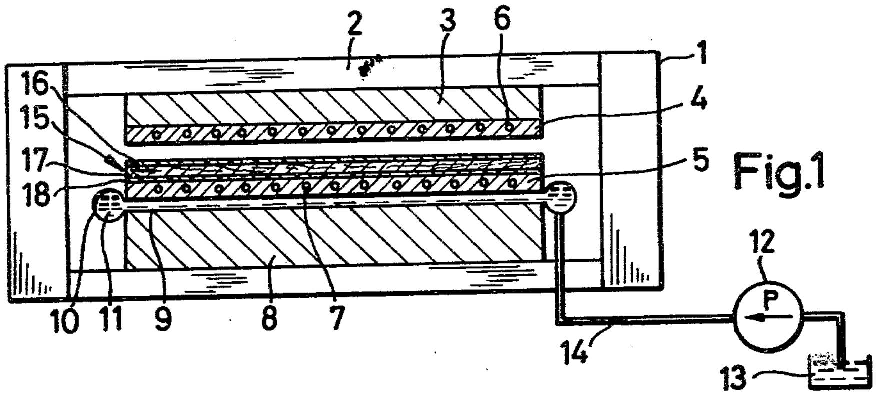
FIGS. 1 to 3 are diagrammatic views showing a working cycle of the press according to the invention, the press being shown by way of example merely in respect of the principle of its operation.
Figure 2:
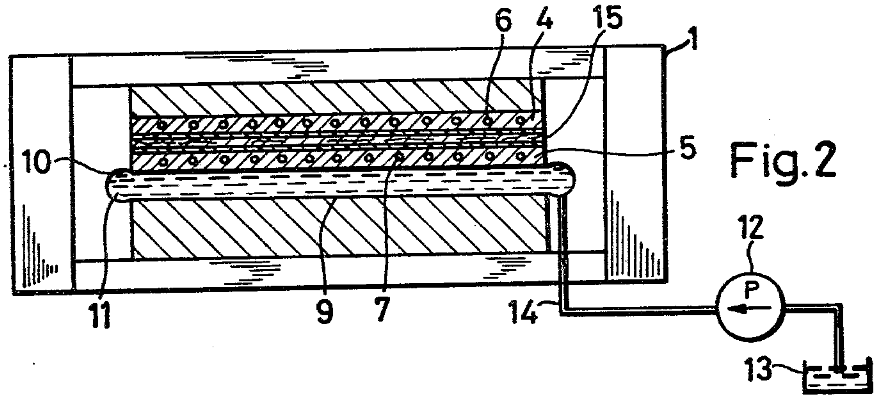
Figure 3:
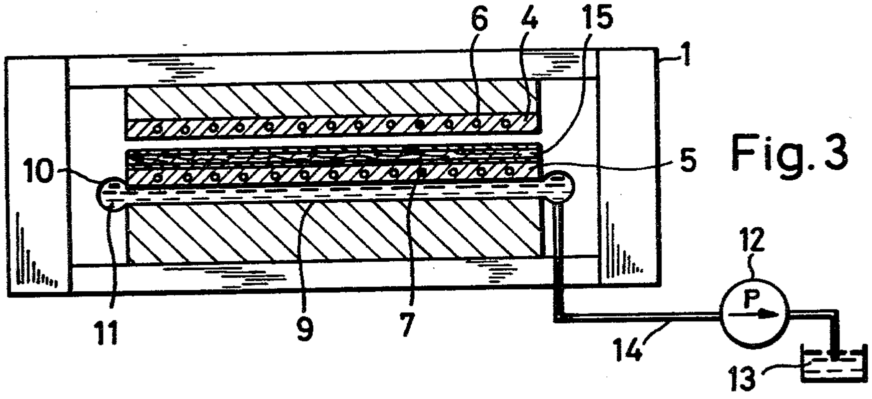

In a first embodiment of the invention, shown in diagrammatic form in FIGS. 1 to 3, a press 1 according to the invention has a press frame 2. Mounted therein is a top bearing plate 3 carrying a top pressing plate 4. A bottom pressing plate 5 and the top plate 4 comprise heating elements 6, 7 respectively—i.e., the embodiment shown is a hot press. Also disposed in frame 2 is a bottom bearing or support plate 8 on which a flexible hollow member inflatable by a pressure medium, in the form of a bag 9, is supported. The bottom plate 5 bears on bag 9.

The bag edge which projects beyond the edges of plates 8 and 5 has an annular bead or hollow frame 10 which, like the complete bag 9, is also full of pressure medium 11 which a pump 12 supplies from a tank 13 through a line 14 to bag 9. Disposed on the bottom plate 5 is a shaped article 15 which is to be pressed and which in the example shown comprises a core or central element 17, a top covering layer 16 and a bottom covering layer 18. The article 15 can be any kind of laminate or what will be subsequently a chipboard or coreboard or the like.

The constructional details visible in the diagrammatic views of FIGS. 1 to 3 will be referred to hereinafter.

The main operating steps of a press cycle are shown in FIGS. 1 to 3 to make clear the basic operating principle of the press according to the invention.

The press is in the open state in FIG. 1, the bag 9 being uninflated—i.e., the pump 12 has pumped the medium 11, advantageously water, out of bag 9 and through line 14 into tank 13. A laminate 15 for pressing is introduced between the open plates 4 and 5 which, if the press according to the invention is to be used in a very advantageous manner for treating shaped articles stuck together by means of heat-activated adhesives, are heated by the heating elements 6, 7.

Beginning from the state shown in FIG. 1, pump 12 pumps pressure medium 11 from tank or sump 13 through line 14 into bag 9 which alters its volume and therefore raises the bottom plate 5 and presses the article 15 disposed between the top plate 4 and the bottom plate 5, with heating of the article. Through the agency of the bag 9 the pressure is applied in extended fashion over the entire surface of the plate 5 so that the same experiences scarcely any bending stress. However, should sagging occur because of the spring rate of the frame 2 or of the top plate 4, the bottom plate 5 including the bag surface follows the sagging, so that the article 15 retains a constant height and, upon the return of the press to normal, assumes by virtue of its own elasticity a completely plane shape of uniform cross-section.

Pressure medium continues to be supplied to bag 9 until the required working pressure has been reached. The working pressure can be controlled e.g. by a pressure limiting means (not shown) which operates conventionally and which is disposed in line 14 and which stops the pump once the required pressure has been reached. As will be described in greater detail hereinafter, the function of the annular bead or hollow frame 10 at the exposed edges is to ensure that, in the region which is not borne by the plates 4, 5 and in which only tensile stresses can occur anyway, no bending stresses occur and the stresses which do occur are substantially only tensile stresses, so that the flexible material of which the bag 9 is made can readily withstand relatively high pressures. Also, the annular bead or hollow frame 10 provides a very special and unpredictable effect in that, when air enters the hydraulic system, something which is virtually unavoidable in hydraulic systems of this kind, in a manner which would disturb conventional systems considerably, such air can collect in the top part of the bead or frame 10 and does not disturb operation of the press. Indeed, the contrary is the case since the air thus trapped at the top of the bead or frame 10 acts like an accumulator because, when the pump 12 stops when the pressure to which the pressure limiting means (not shown) is set has been reached, the working pressure is maintained by the compensating action of the cushion of air.

In the press cycle phase shown in FIG. 3, the actual step of pressing the article 15 has been completed and the press is starting to open. To open the press 1 according to the invention, the bag 9 is deflated by the pump 12 pumping the medium 11 out of bag 9 through line 14 back to tank 13. The operative cycle of the press according to the invention is therefore positively controlled both in the closing direction and in the opening direction. A minor boost to the opening operation is provided by the force of gravity acting on the bottom plate 5 and article 15. The medium 11 can be pumped out of the bag 9 either by reversal of the direction of delivery of the pump 12 in the case of reversible pumps or just by changing over the intake and delivery side by means of appropriate known valve facilities (not shown).

Figure 4:
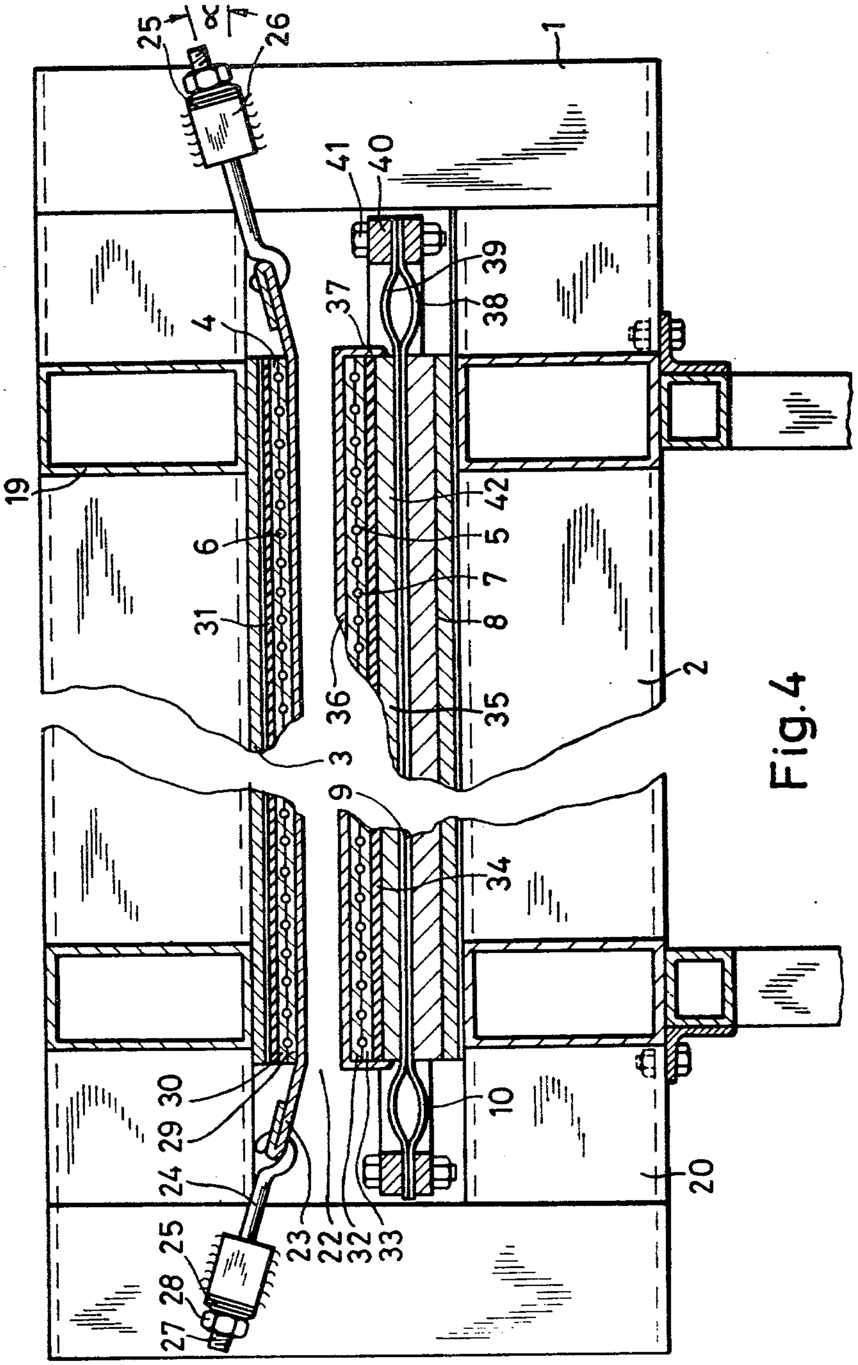
FIG. 4 is a sectional view showing constructional details of a form of the press according to the invention.
Figure 5:
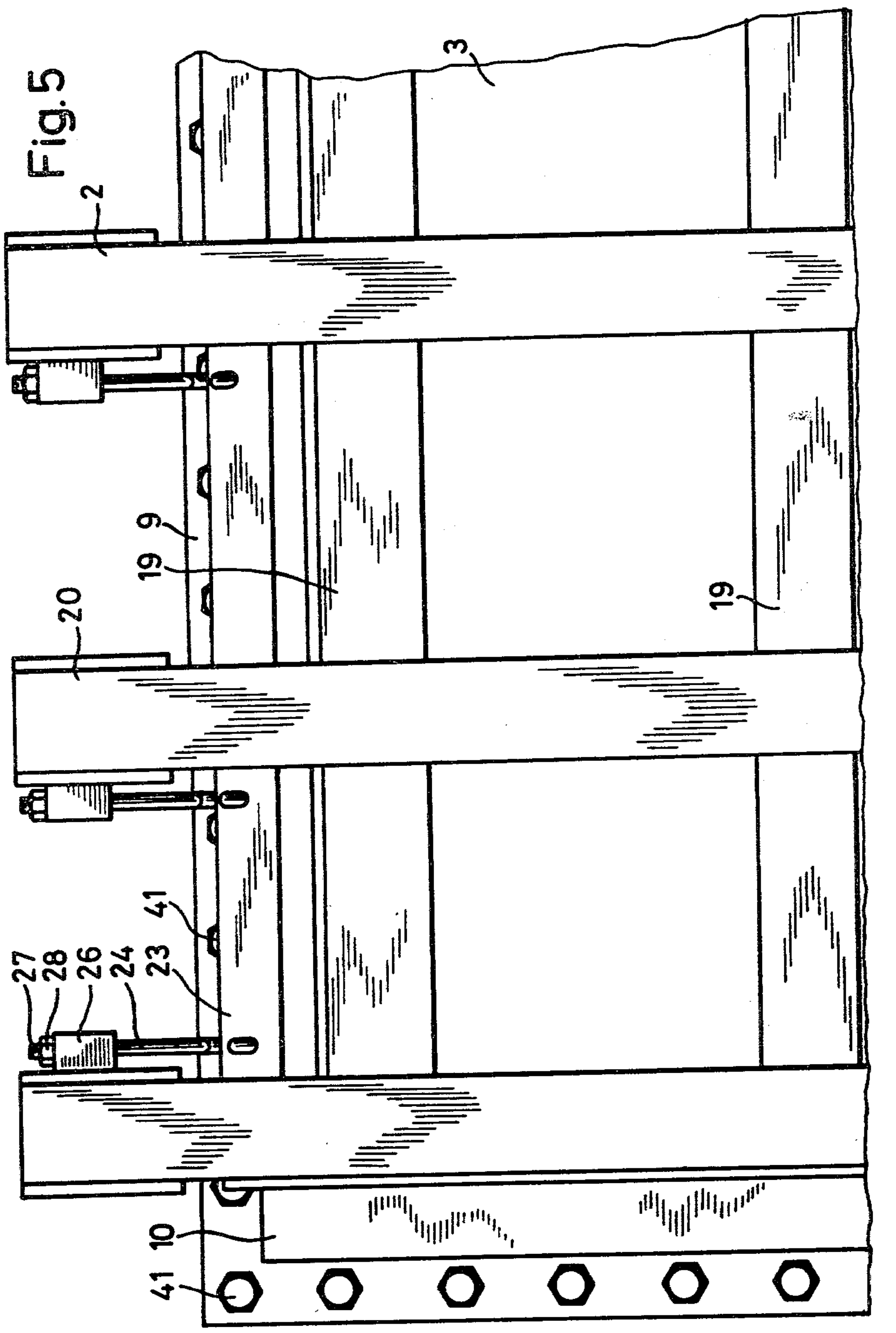
FIG. 5 is a plan view of a part of the press shown in FIG. 4.

FIGS. 4 and 5 show a mechanically very simple embodiment of the press 1 according to the invention in its constructional details. To simplify the illustration, the pump 12 and associated control facilities and lines have been omitted. As in the diagrams of FIGS. 1 to 3, the press 1 of FIGS. 4 and 5 has a press frame 2 which, since the pressure is applied over the whole area and not, as is conventional, at a number of spots, can be constructed of ordinary box sections 20, the same forming frames distributed at intervals over the whole area of the press. Frame 2 is mounted on posts 21, shown in FIG. 4, at a height such that nip 22 of the press is disposed substantially coplanar with a feeding table (not shown) on which the material which it is required to press is prepared.

In the embodiment shown in FIG. 4, the top press plate 4 is mounted by being suspended in a cover 23 which is so suspended resiliently as to have a force component operative upwardly at an angle $\alpha$. Cover 23 is secured by means of hooks 24 disposed on two opposite sides of the press 1 and which are resiliently retained through the agency of spring discs 25 in an abutment 26 on frame 2. Also, the tension with which the hooks 24 bear the cover 23 is adjustable, to which end the hook ends 27 have screwthreads receiving nuts 28 adapted to be tightened against the abutment 26 welded fast to the frame 2. This kind of arrangement makes it possible to absorb heat expansion arising because of the plate 4 being heated by the heating elements 6, thus preventing any sag of the cover 23, the same also being the actual pressing surface of the top pressing plate 4.

In the embodiment shown the top plate 4 is devised from two plates 29, 30 between which the heating elements 6 are disposed. Also a layer 31 of heat insulation, although not absolutely essential, is provided between the plates 4 and 3.

The bottom plate 5 also comprises two layers 32, 33 between which the heating elements 7 are disposed, plus an additional, but not strictly necessary, layer 34 of insulation. Behind layer 34 is a backing plate 35 which engages with the bag 9. The bottom plate 5 also has a cover 36, the same having at its edges downwardly extending flanges 37 which prevent lateral shifting of the integer embodied by the plates and layers 32–35.

In the embodiment shown the bag 9 takes the form of two special steel plates 38, 39 interconnected radially outwards of the bead or frame 10 by a two-element clamping frame 40 engaging around the outside of the plates 38, 39 on both sides. A number of continuous threaded bolts 41, passing through the two frame parts are used so to secure the two parts of the frame 40 to one another that the plates 38, 39 are clamped between the frame parts. A bag 10 as thus embodied is very advantageous since it is devoid of any welded or beaded connections in the space not covered by the plate 5. A more detailed description will be given of the element 10 with reference to FIGS. 6 and 7.

Below bag 9, as can be seen in FIG. 4, there is e.g. one of the possible spacer elements or plates 42 for adjusting the press stroke to suit the material being treated. The member 42 can be made e.g. of wood. The plate 42 rests on the bottom bearing or support plate 8 via which pressures are transmitted to the frame 2. Some appropriate form of lifting facility (not shown) can be provided to raise the inflatable bag with the set of plates on it when it is required to change one plate 42 for another one.

Details of the arrangement of the mounting of the top cover 23 can be gathered from FIG. 5, which is a plan view of FIG. 4. Details of the hollow frame 10 and of its production and operation can be seen more clearly in FIGS. 6 and 7, where the references used are the same as in FIGS. 4 and 5.

Figure 6:
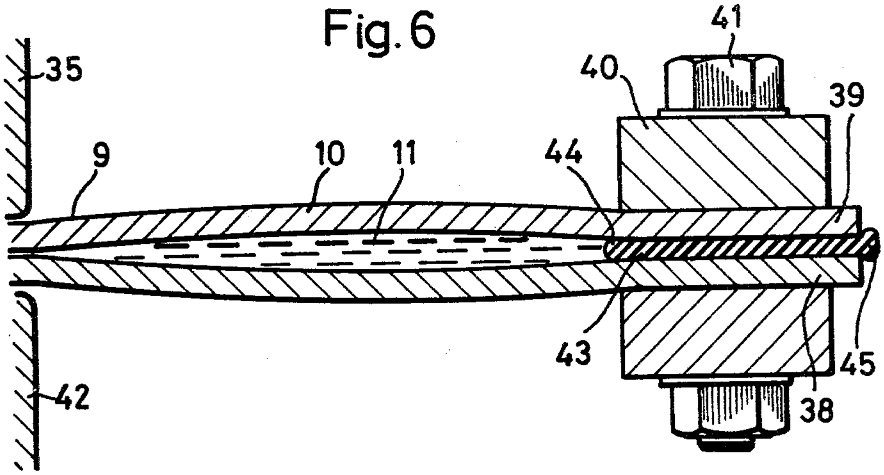
FIGS. 6 and 7 show details of the hollow frame of the inflatable bag.

FIG. 6 shows the hollow frame 10 just before the first operation of the press 1. As can be seen, the two plates 38, 39 forming the bag are secured by the two-part clamping frame 40, whose parts are pressed together by the bolts 41, at the edge zones disposed radially outwards of the region of the pressing plates and of the hollow frame 10; as the simplest form of seal, a sealing strip 43 is provided between the plates 38 and 39. In this state the hollow frame is substantially still unformed apart from a slight deformation of the plates 38, 39 arising from the size of the clamping frame 40. In FIG. 6 there can be seen the seal edge regions 44, 45 which have been deformed by the clamping pressure of the bolts 41.

To form the frame 10, tie pressure medium 11 makes its first entry into the bag 9 at an appropriate high pressure which is higher than the normal working pressure. The edge zone of the plates 38, 39 which extends beyond the pressing plates therefore experiences a permanent deformation, and so the formation of the hollow frame 10 is complete.

Figure 7:
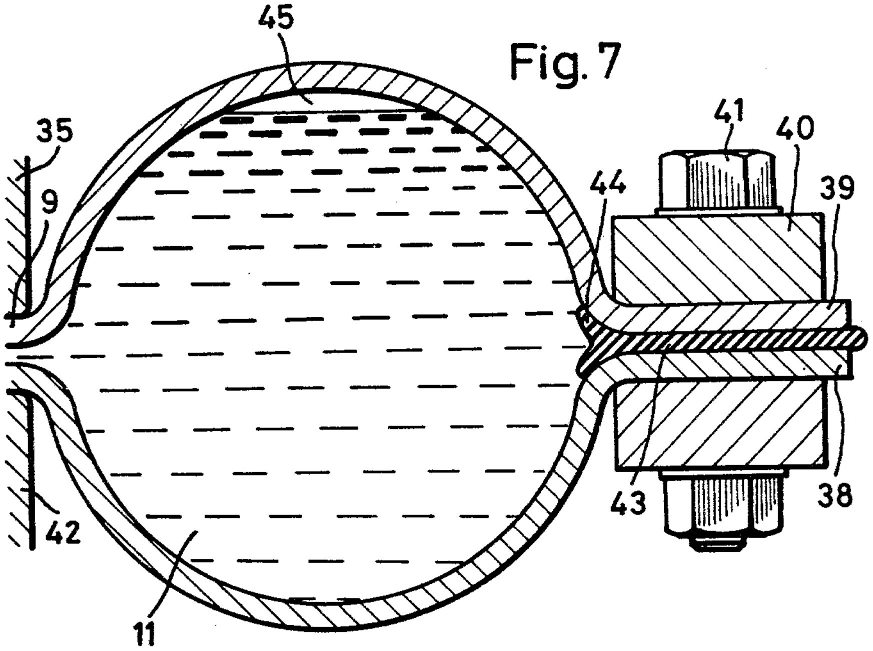

FIG. 7 shows another special feature of the very simple seal 43; as the pressure rises, the inwardly disposed bead 44 produced by the clamping force of the bolts 41 becomes so distorted by the pressure of the pressure medium as to acquire in cross-section a tulip-shape, with the result that the sealing zone of the strip 43 is increased considerably precisely on the pressure-experiencing side.

The accumulator effect of the hollow frame 10 can also be gathered from FIG. 7. When the press is in operation, air unavoidably introduced by the system collects near the top of the hollow frame 10 and forms an air cushion 45 which is compressed when the bag 9 is inflated and which therefore acts as an accumulator to help keep the working pressure constant.

Figure 8:
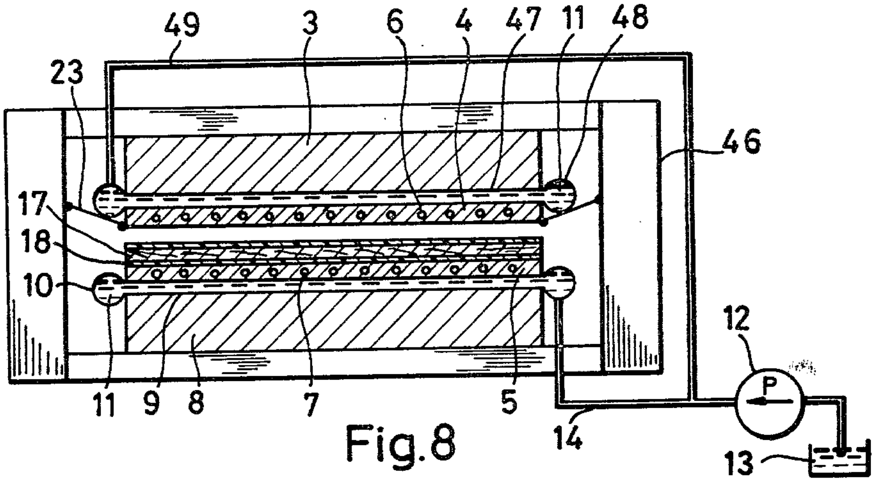
FIG. 8 is a diagrammatic view of another embodiment of the invention.

FIG. 8 shows a variant of the apparatus according to the invention; its constructional details correspond substantially to the embodiment previously described. However, unlike the other embodiments, the embodiment of FIG. 8 is devised as a double-acting press 46, a further inflatable bag 47 being disposed between the top pressing plate 4 and the top plate 3 and also having an annular bead or hollow frame 48 and also being supplied with pressure medium 11. The same is also supplied by pump 12 through a line 49.

Figure 9:
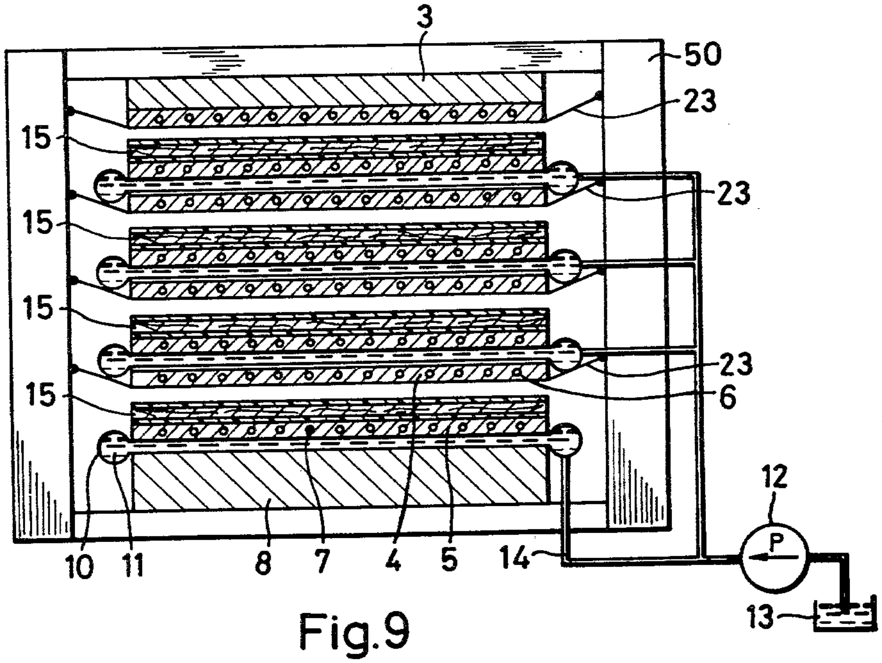
FIG. 9 is a diagrammatic view of the press according to the invention.

The embodiment shown in FIG. 9 is of a tiered press 50 whose constructional details can correspond to those of the other embodiments, so that no further description is needed to disclose the contents of what is shown in FIG. 9.

In the plate press according to the above embodiment in accordance with the intended purpose of use the pressure cushion takes the form of a high pressure long stroke pressure cushion and is preferably made of metal, more particularly high quality steel or some similar metal of correspondingly high strength, this also affording the possibility of constructing the plate press as a hot plate press. Practical experience has shown that, as will be described in greater detail in the following description, due to the movement of the material of the pressure cushion wall, subjected to tensile stressing, in the corner zones kinks may form which considerably shorten the life of the pressure cushion measured in load applications.

At first, under reference to FIGS. 10 to 13 of the drawings, there will be a discussion of the basic problem, forming the background to the embodiment according to FIGS. 14 to 17.

Figure 10:
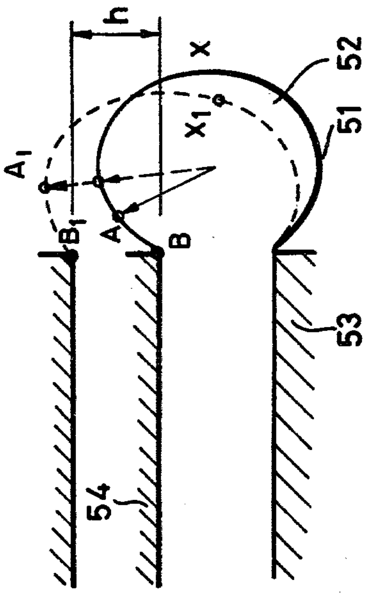
Figure 12:
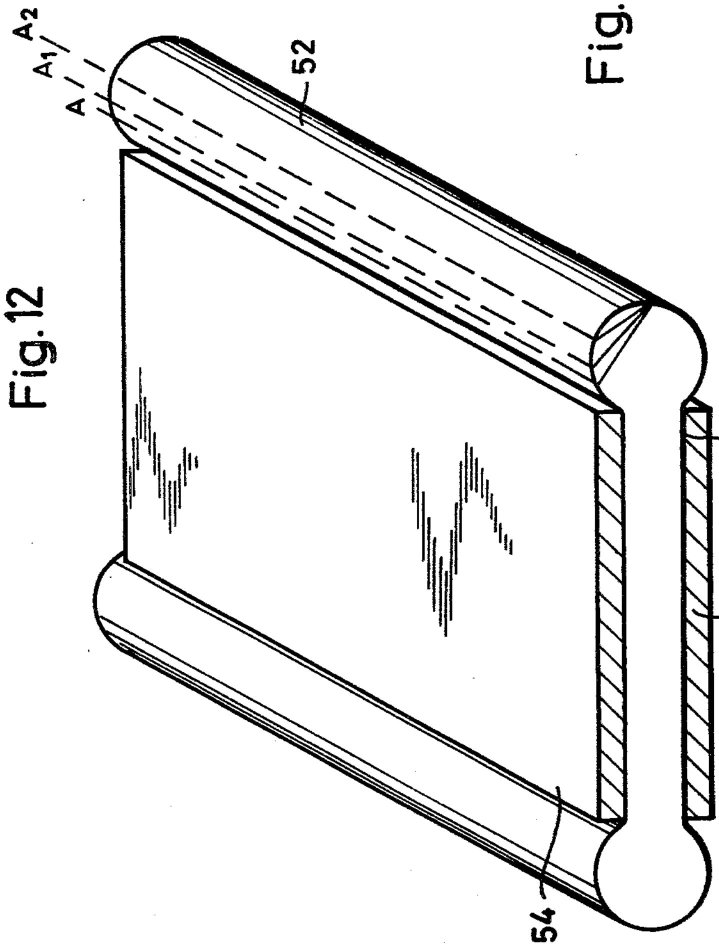

To this end FIG. 10 shows diagrammatically a pressure cushion 1 with part of a hollow frame 52, as shown in the parent patent, which is borne on an abutment 53 and bears a raisable pressure plate 54. If we assume that during the stroke of the press h the point B is displaced to the position $B_1$, the point X is displaced to the position $X_1$ and the point A is displaced over a relatively large periphery in the direction $A_1$, $A_1'$. When the press is relieved the converse sequence of movement takes place. As shown in FIG. 12, this type of movement causes no problems as long as it lies on a straight line for all points A and then moves to line $A_1$ and line $A_2$ parallel with the rectilinear hollow frame portion.

Figure 11:
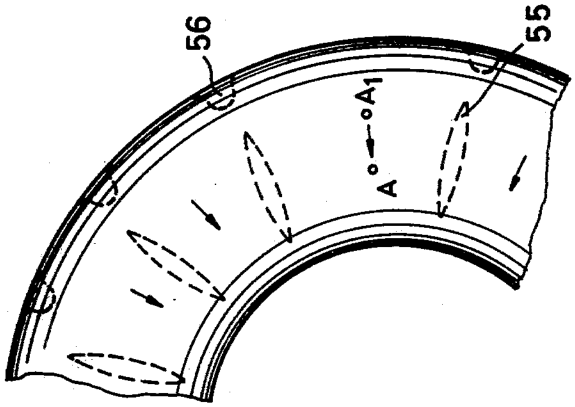
FIGS. 10 to 13 are drawings explaining the ideas on which a modified embodiment is based.

This movement of the points $A_i$, defining the pressure and upsetting lines, of the rectilinear lateral edge of such a hollow frame, or even if the pressure cushion is completely covered by the pressure plates, becomes problematic in the corner zones, for instance, of a rectangular pressure cushion, where the hollow frame passes around in a certain radius, since in this case (FIG. 13) the pressure and upsetting lines $A_i$ of one lateral edge of the rectangle intersect the pressure and upsetting line $B_i$ of the other lateral edge of the rectangle. In these circumstances even after a few load applications either kinks form on the top and bottom sides of the hollow frame, as shown in FIG. 11, if the hollow frame is retained by an outer rigid clamping frame, since in that case (cf. FIG. 10) when the press makes its stroke the point A moves in the direction of the point $A_1'$ and the material is slightly expanded; or else the kinks 56 (FIG. 11) are also formed on the outer periphery of the curve, this being due to the displacements of point X in the direction $X_1$.

These problems occur in all prior art metal bellows of round cross-sectional contours, so that the prior art has either attempted to make the bellows of a resilient material for low pressure or to provide for high pressure metal bellows with only a very small stroke. Even after a very short time metal bellows tear at the kinking places and become unusable. Clearly, the kinking tendency can be reduced by forming a hollow frame of this kind in the largest possible radius at the corners. However, this is very inconvenient for the application according to the invention, since the workpieces to be treated have large surfaces, and therefore only a relatively small rectangular pressure plate can be accommodated on a pressure cushion with as large corner radii as possible.

Figure 13:
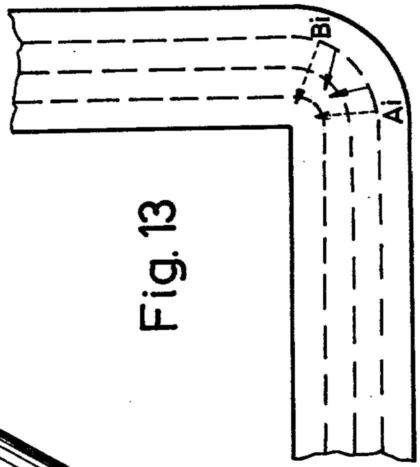
Figure 14:
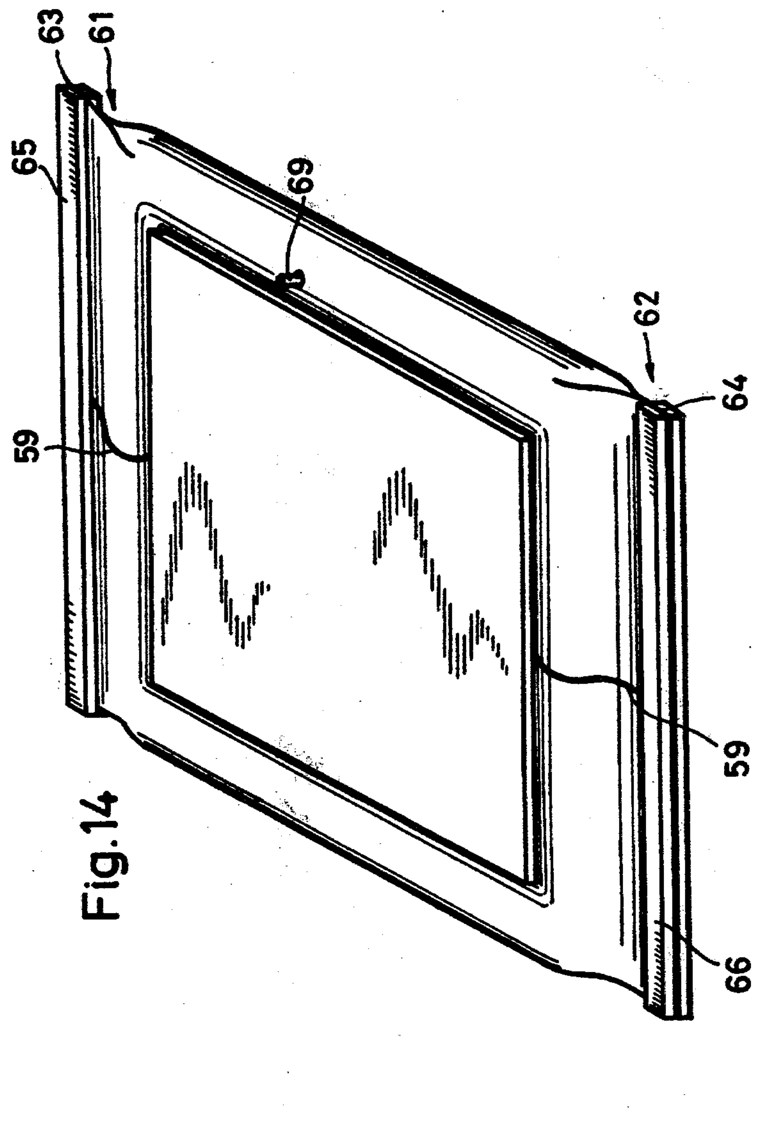
FIG. 14 is a perspective view of the pressure cushion for the plate press according to the invention.

FIG. 13 shows more particularly that with bellows of this kind kinking can occur only where the wall material of the hollow frame or of each bellows, designed for tensile stress, is subjected to compressive or shearing stress (i.e., only where the pressure and upsetting lines $A_i$ can bear on the pressure and upsetting lines $B_i$ and vice-versa).

On the basis of these considerations, the invention provides an embodiment (FIGS. 14 to 17) of a pressure cushion in the press described above. In the embodiment illustrated the pressure cushion 57, which preferably takes the form of a long-stroke high-pressure cushion for a high-pressure hot plate press as described above, consists of a metal plate 58, more particularly of high-strength rust-resistant (stainless) steel, which is first closed after the form of a hose by a weld 59. Then the resulting hose shape is flattened at both ends 61, 62 parallel with one another and either welded up by welds 63, 64 or closed by a seal and held together by a two-part clamp through which screws extend, and is held rectilinear by such clamp.

In the embodiment illustrated in FIGS. 14 to 17 to relieve the transverse seams 63, 64 a retaining clamp 65, 66 is provided at each of the two ends, although the clamp 65, 66 exerts no tensile stressing in the main plane of the pressure cushion 57 on the ends 62, 63.

As in the embodiment described above, in one further embodiment of the invention the pressure cushion 57 is borne on an abutment 68 and bears a movable pressure plate 67 which when pressure is applied via one or more inlet spigots 69 in the zone of the hollow frame 70 is raised for the pressing stroke and lowered when relieved by the pressure medium being pumped away.

In a preferred embodiment of the invention the spigot 69 is disposed on the top side of the hollow frame 70 of the pressure cushion 57, this giving the special advantage of a very rapid load application, since all that is needed for a load application is the relieving or loading of the air cushion 71 formed in the top zone of the hollow frame 70. Air is of course compressible in comparison with a hydraulic liquid—i.e., if the spigot 69 were disposed on the bottom side of the hollow frame, a very much larger amount of liquid would have to be pumped in and out to perform a stroke of the press, since first of all the compressibility of the air cushion 71 would have to be compensated.

The pressure cushion envelope, preferably of rust-resistant (stainless) steel, produced in accordance with the foregoing description assumes after the first loading the shape illustrated in FIGS. 14 to 17, with which the hollow frame 70 is automatically formed.

The special nature of the resulting shape of the pressure cushion will now be explained with special reference to FIG. 15.

Figure 15:
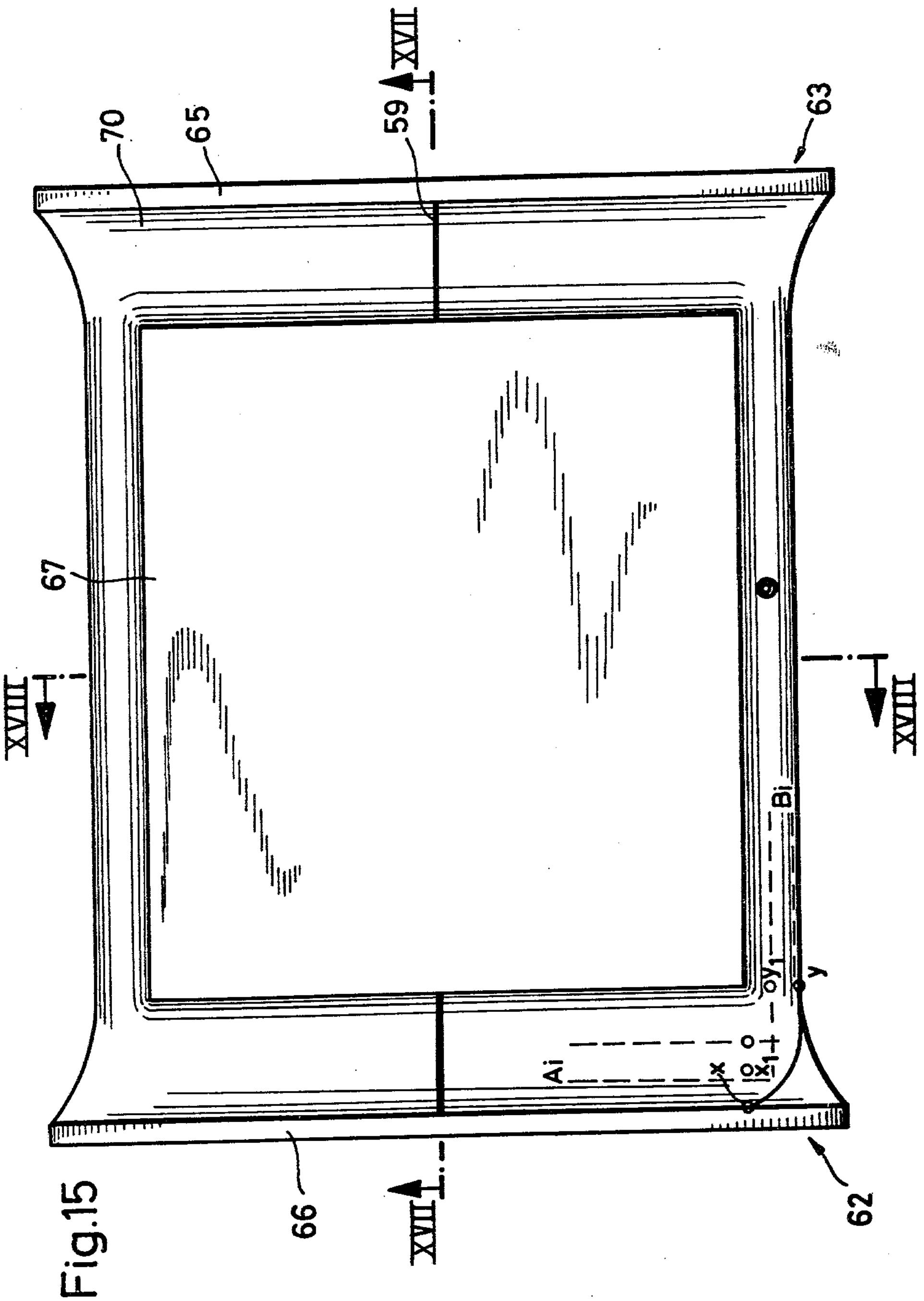
FIG. 15 is a plan view of the pressure cushion shown in FIG. 14.
Figure 17:
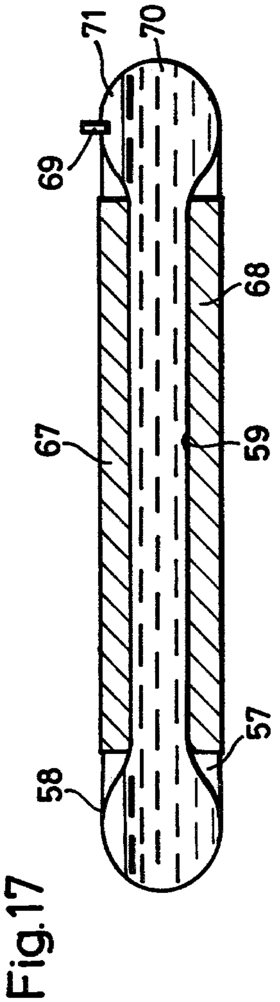
FIG. 17 is a sectional view taken along the line VIII—VIII in FIG. 15.
Figure 16:
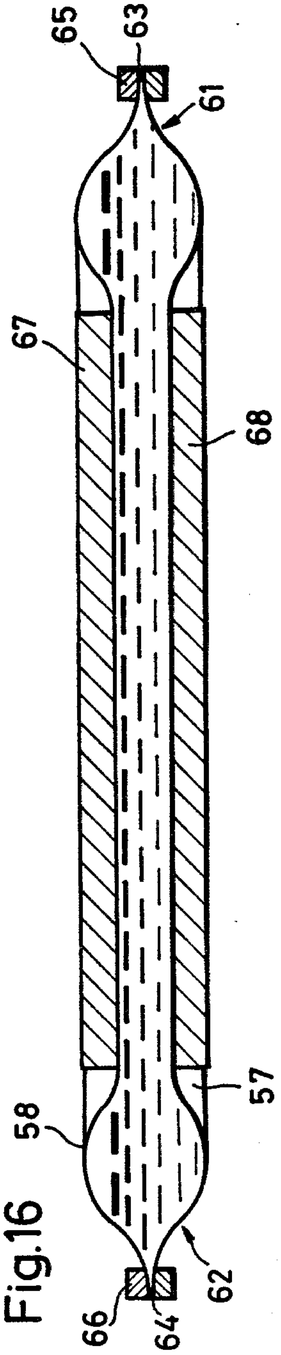
FIG. 16 is a diagrammatical sectional view, taken along the line VII—VII.

The pressure and upsetting lines $A_i$, $B_i$ which are defined by the movement of the points X in the direction $X_1$ and of the points Y in the direction $Y_1$ are shown in the bottom left-hand corner of FIG. 15. Combined with the sectional views of FIGS. 16 and 17, which are considerably exaggerated as regards the height and curvature of the hollow frame 70, it shows clearly that due to the special geometrical shape the pressure and upsetting lines $A_i$, $B_i$ intersect one another in a zone where there is no material, to form a supporting line, so that the pressure cushion cannot kink in the zone of points of intersection of the pressure and upsetting lines.

The invention of this embodiment thus achieves the advantage that the number of load applications—i.e., the life of the pressure cushion—is increased by a factor of more than 20,000, since due to the interruption of the pressure and upsetting lines at the corners of the pressure cushion, their points can no longer be additive, so that kink formation is rendered impossible.

What is claimed is:

1. A press to apply pressure to a three dimensional shaped article which comprises:

(a) a first horizontal pressing plate and a second horizontal pressing plate facing each other with a nip therebetween;

(b) a flexible hollow member disposed against said first horizontal pressing plate on the side opposite said nip, said flexible hollow member being a part of a closed system containing a pressure medium and means for regulating the pressure of said pressure medium said flexible hollow member being formed from non-stretchable metal sheets;

(c) an inflexible support behind said flexible hollow member, whereby upon a change of the pressure of said pressure medium, said first horizontal pressing plate is caused to move relative to said second horizontal pressing plate; and (d) a flexible hollow member marginal zone projecting beyond all sides of said first horizontal pressing plate and inflexible support and forming a hollow space which is larger than the remainder of said flexible hollow member in contact with said first pressure plate and inflexible support;

wherein said flexible hollow member takes the form of a large-area pressure cushion bearing against the pressure plate, wherein the marginal zones of the pressure cushion can move freely and are subjected to exclusively tensile stressing when the press makes its stroke, that the pressure and upsetting lines at the corners of the pressure cushion which are defined by the movement of the wall zones occuring during the pressing and release of the pressure cushion are interrupted by a geometrical change in the cross-section of the closed system.

2. A press of claim 1, wherein pressure and said upsetting lines intersect in the free space at the corners external of the wall material.

3. A press of claim 2, wherein said pressure cushion consists of a rectangular web of material which is closed after the fashion of a hose by a longitudinal seam and closed at the flattened ends by two transverse seams.

4. A press of claim 3, wherein said pressure cushion longitudinal and transverse seams take the form of welds.

5. A press of claim 3, wherein the transverse seams are closed by clamps and seals.

6. A press of claim 4, wherein the transverse seams are extended and relieved by clamps.

7. A press of claim 6, wherein an inlet spigot for the supply and removal of said pressure medium is disposed on the top side of a hollow frame formed by the walls.

* * * * *